(12) United States Patent
Crane

(10) Patent No.: US 8,040,001 B2
(45) Date of Patent: Oct. 18, 2011

(54) ASSEMBLIES FOR ELECTRICAL MACHINES

(75) Inventor: Allan David Crane, Gwynedd (GB)

(73) Assignee: Converteam Technology Ltd., Warwickshire (GB)

( * ) Notice: Subject to any disclaimer, the term of this patent is extended or adjusted under 35 U.S.C. 154(b) by 239 days.

(21) Appl. No.: 12/551,742

(22) Filed: Sep. 1, 2009

(65) Prior Publication Data

US 2010/0072834 A1   Mar. 25, 2010

(30) Foreign Application Priority Data

Sep. 8, 2008   (EP) .................................. 080157704

(51) Int. Cl.
*H02K 9/19* (2006.01)
(52) U.S. Cl. ............ 310/54; 174/16.2; 361/699; 310/71
(58) Field of Classification Search .................... 310/54, 310/52, 71; 361/677; 174/16.2
See application file for complete search history.

(56) References Cited

U.S. PATENT DOCUMENTS

| | | | |
|---|---|---|---|
| 3,239,701 A | 3/1966 | Campbell | |
| 3,562,564 A | 2/1971 | Potter | |
| 5,055,729 A * | 10/1991 | Fogarty et al. | 310/214 |
| 5,270,572 A * | 12/1993 | Nakajima et al. | 257/714 |
| 5,448,108 A * | 9/1995 | Quon et al. | 257/714 |
| 5,491,370 A * | 2/1996 | Schneider et al. | 310/54 |
| 5,978,220 A * | 11/1999 | Frey et al. | 361/699 |
| 6,894,411 B2 * | 5/2005 | Schmid et al. | 310/71 |
| 7,049,716 B2 * | 5/2006 | Grundl et al. | 310/52 |
| 7,333,331 B2 * | 2/2008 | Yamabuchi et al. | 361/699 |
| 2003/0178896 A1* | 9/2003 | Crane | 310/68 R |
| 2010/0072834 A1* | 3/2010 | Crane | 310/54 |

FOREIGN PATENT DOCUMENTS

| | | |
|---|---|---|
| EP | 0049735 A1 | 4/1982 |
| JP | 2000197311 * | 7/2000 |

* cited by examiner

*Primary Examiner* — Karl Tamai
(74) *Attorney, Agent, or Firm* — Eckert Seamans Cherin & Mellott, LLC; David V. Radack, Esq.

(57) ABSTRACT

The present invention provides an assembly for mounting to, or forming part of, the stator assembly of a rotating electrical machine. A plurality of component modules are provided at angularly spaced-apart locations around the assembly and contain power electronics components. Electrically conductive toroidal inlet and outlet manifolds are provided to convey coolant fluid (preferably a liquid dielectric such as MIDEL) to and from the component modules. The inlet and outlet manifolds provide a dual function as a coolant circuit for conveying coolant fluid and as busbars.

9 Claims, 2 Drawing Sheets

ASSEMBLIES FOR ELECTRICAL MACHINES

CROSS REFERENCE TO RELATED APPLICATION

This application claims priority to European Patent Application No. 08015770.4 filed Sep. 8, 2008.

FIELD OF THE INVENTION

The present invention relates to improvements in assemblies mounted to, or forming part of, stator assemblies for electrical machines, and in particular to stator assemblies with integral power electronics.

BACKGROUND OF THE INVENTION

Electrical machines are widely used in industrial applications for converting electrical energy into rotational or linear movement (in the case of a motor) or for producing electrical energy from rotational or linear movement (in the case of a generator). Known arrangements use busbars to supply power to control circuitry associated with the electrical machine and separate coolant circuits to cool the same.

SUMMARY OF THE INVENTION

The present invention provides an assembly for an electrical machine (which can be of rotating or linear construction) comprising: a plurality of component modules; and electrically conductive inlet and outlet manifolds for conveying liquid dielectric coolant to and from the component modules and for one or more of supplying power to and receiving power from the component modules; wherein the inlet manifold is connected to a primary inlet and the outlet manifold is connected to a primary outlet; the component modules being fluid-tight housings containing liquid dielectric coolant, each housing including an inlet pipe connected to the inlet manifold and an outlet pipe connected to the outlet manifold such that liquid dielectric coolant is supplied to the inlet manifold through the primary inlet, is conveyed to each of the housings through the inlet pipes, is conveyed from each of the housings through the outlet pipes to the outlet manifold, and is then discharged through the primary outlet such that, in use, liquid dielectric coolant is circulated through each of the housings to cool power electronics components (e.g. any power electronics components forming control circuitry or static power converter circuitry) within each housing that are at least partially immersed in the liquid dielectric coolant.

The inlet and outlet manifolds therefore provide a dual function as a coolant circuit for conveying coolant fluid to and from the component modules and as busbars for supplying power to, and/or receiving power from, the component modules depending on the operating conditions of the electrical machine. If the electrical machine is operating as a motor then the inlet and outlet manifolds may supply power to the component modules. On the other hand, if the electrical machine is operating as a generator then the inlet and outlet manifolds may receive power from the component modules and supply that power to a suitable supply network or power grid. Any dc power that is carried by the inlet and outlet manifolds may be derived from an ac supply which would include the stator windings of the electrical machine. for example.

In the case of a rotating electrical machine the component modules are preferably provided at angularly spaced-apart locations around the assembly. The component modules may be evenly or unevenly spaced around the assembly depending on the design of the electrical machine. The inlet and outlet manifolds are preferably ring-shaped (e.g. toroidal) so as to align with the angularly spaced component modules that are disposed around the assembly. Of course, by mentioning ring-shaped, it will be readily appreciated that the inlet and outlet manifolds do not necessarily have to be circular and may have any convenient shape so as to form electrically conductive busbars that extend continuously around the assembly to electrically interconnect with the component modules. The inlet and outlet manifolds may be of tubular construction and may have any convenient cross-section for defining a passage along which the coolant fluid is conveyed.

The inlet and outlet manifolds may be spaced apart in the axial and/or radial direction.

In the case of a linear electrical machine the component modules are preferably provided at linearly spaced-apart locations along the assembly. The inlet and outlet manifolds may have any convenient shape so as to form electrically conductive busbars that extend continuously along the assembly to electrically interconnect with the component modules.

The inlet pipes will normally be connected to the inlet manifold in parallel. Similarly, the outlet pipes will normally be connected to the outlet manifold in parallel. Each housing is therefore connected to both the inlet manifold and the outlet manifold so that liquid dielectric coolant can be circulated through it to cool the at least partially immersed power electronics components.

The liquid dielectric coolant is preferably circulated continuously through the housings during the periods when cooling is required.

The fluid-tight housings may be made of any convenient material. If the housings are made of a metallic material then it is preferably earthed using suitable insulation bushes or the like. A removable lid may provide access to the interior of the housings for maintenance and repair of the power electronics component and any associated components located within the housings.

The component modules and inlet and outlet manifolds may be secured to a rigid structure to form an assembly that is then resiliently mounted to the stator assembly of the electrical machine. Flexible links or connectors are preferably used at all interfaces between the assembly and the stator assembly of the electrical machine in order to accommodate shock and differential thermal expansion.

The inlet and outlet manifolds may carry a dc supply. More particularly, the inlet and outlet manifolds may respectively define a busbar for each polarity of the dc supply.

The inlet and outlet manifolds may carry an ac supply. In this case one or more additional busbars may be provided. For example, in the case of a three-phase ac supply then the inlet and outlet manifolds may carry two of the three phases and an additional busbar may be provided to carry the third phase. A further additional busbar may be provided for connection to a neutral or earth point to simplify the control circuitry or power converter circuitry, for example. It would, of course, be possible to utilise an ac supply having two phases or more than three phases, if this was considered to be desirable for some reason. The total number of busbars (i.e. inlet and outlet manifolds and additional busbars where applicable) will be selected to match the number of phases of the ac supply.

The additional busbars will not normally form part of the coolant circuit and are provided only for the purpose of carrying power. The additional busbars need not be tubular and may have any suitable construction.

In the case of a rotating electrical machine the additional busbars are preferably ring-shaped so as to align with the angularly spaced component modules that are disposed around the assembly. Of course, by mentioning ring-shaped, it will be readily appreciated that the additional busbars do not necessarily have to be circular and may have any convenient shape to extend continuously around the assembly to electrically interconnect with the component modules. In the case of a linear electrical machine the additional busbars may have any convenient shape to extend continuously along the assembly to electrically interconnect with the component modules.

It will be readily appreciated that the term "liquid dielectric" is not just intended to cover proprietary liquids that are specifically marketed as such, but any liquid that has a sufficient dielectric withstand. This would include de-ionised water, FLUORINERT and other equivalent perfluorocarbon fluids, mineral transformer oils, silicone transformer oils, synthetic oils and esters, methylene chloride etc. A particularly preferred coolant is a proprietary transformer insulating fluid such as MIDEL and its equivalents. Any liquid dielectric coolant will be subject to various environmental and chemical compatibility considerations.

The liquid dielectric coolant may be suitable for single-phase cooling applications where the coolant remains in the same phase (typically the liquid phase) throughout. However, in some cases the liquid dielectric coolant may be suitable for two-phase cooling applications where the coolant undergoes a phase change (typically from the liquid phase to the gas phase) to remove additional heat. An option of phase change cooling is therefore possible.

The coolant circuit may be dedicated to the cooling of the power electronics components located within the housings. The electrical machine itself may therefore be cooled by other means, e.g. an air cooled machine. However, it is possible for the coolant circuit to also provide cooling for the electrical machine. The liquid dielectric coolant may therefore be provided from a dedicated supply or from another part of the electrical machine.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
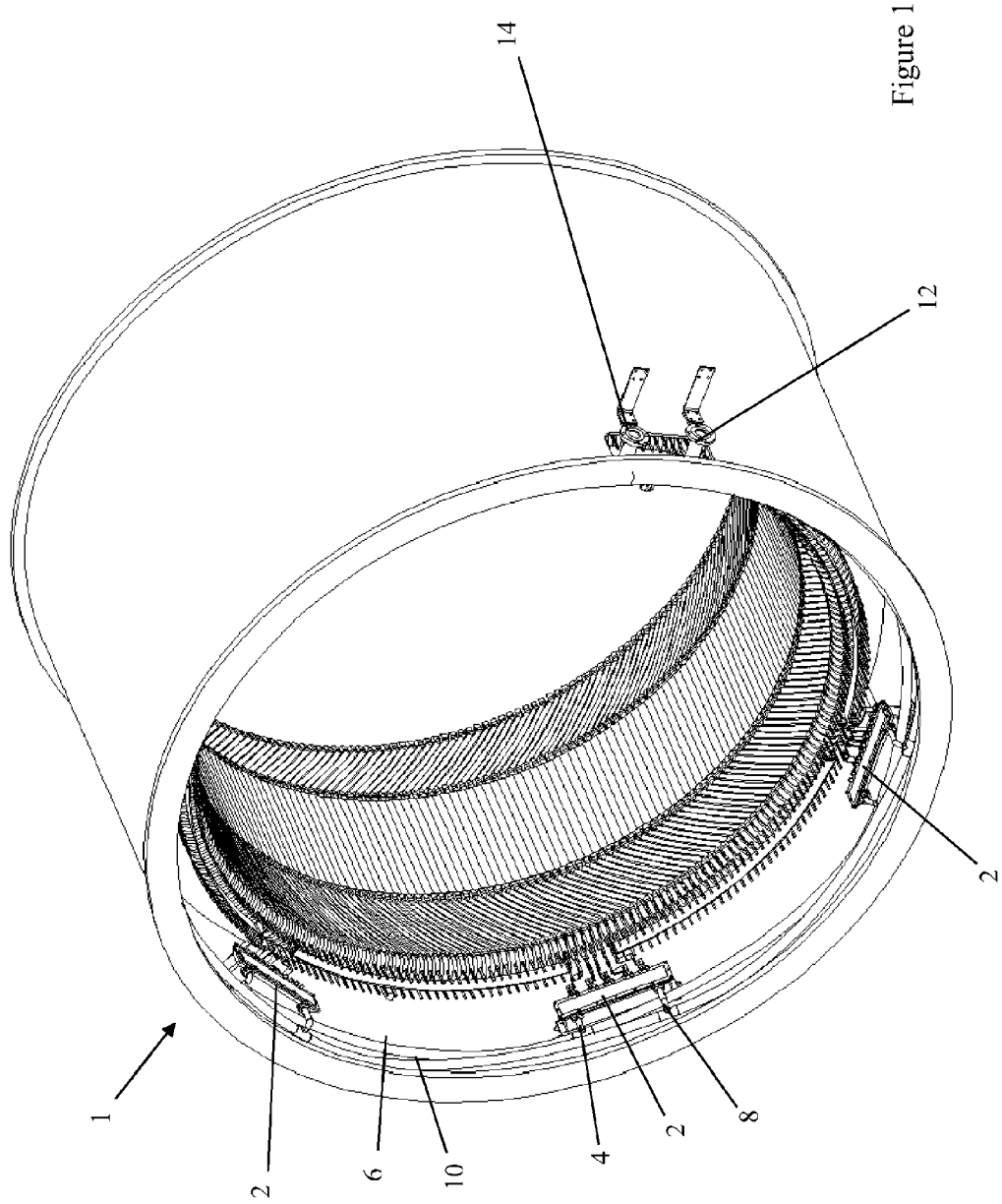
FIG. 1 shows a perspective view of a stator assembly for a wind turbine generator.
Figure 2:
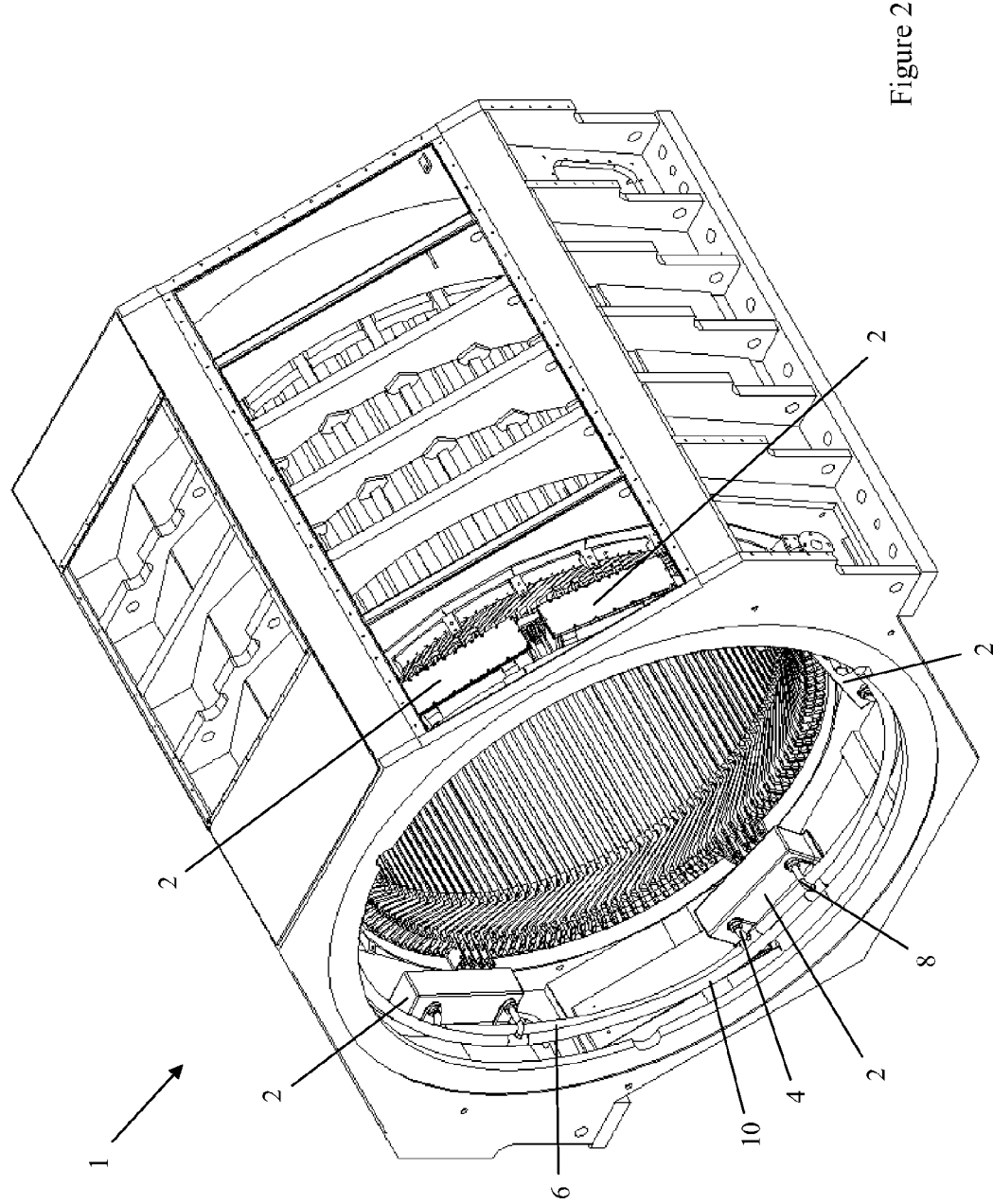
FIG. 2 shows a perspective view of a stator assembly for a marine propulsion motor.

FIGS. 1 and 2 show stator assemblies 1 for air cooled rotating electrical machines. A plurality of angularly spaced component modules 2 are mounted to the stator assemblies adjacent the end windings of the stator winding (not shown). In the case of the stator assembly shown in FIG. 1 six component modules 2 are evenly spaced about the circumference of the stator assembly (only three of which are clearly visible) while in the stator assembly shown in FIG. 2 the component modules are unevenly spaced apart about the circumference of the stator assembly.

Each component module 2 is formed as a fluid-tight housing or container that contains the power electronics components (not shown) which together define a control circuitry associated with the electrical machine.

Each component module 2 includes an inlet pipe 4 that is connected to a toroidal inlet manifold 6. Similarly, each component module 2 includes an outlet pipe 8 that is connected to a toroidal outlet manifold 10.

A liquid dielectric coolant (e.g. MIDEL) is supplied to the inlet manifold 6 through a primary inlet 12 and is then conveyed to each of the component modules 2 through the inlet pipes 4. Liquid dielectric coolant is conveyed from each of the component modules 2 through the outlet pipes 8 to the outlet manifold 10. The liquid dielectric coolant in the outlet manifold 10 is then discharged through a primary outlet 14. Liquid dielectric coolant is therefore continuously circulated through each of the component modules 2 in order to cool the power electronics components (not shown) that are located inside the fluid-tight housings. The flow of liquid dielectric coolant is generally along an axis of the housings (i.e. in a circumferential direction).

The liquid dielectric coolant discharged through the primary outlet 14 may be cooled by a heat exchange unit or other suitable cooling device (not shown) before being returned to the primary inlet 12. The inlet and outlet manifolds 6, 10 therefore form part of a closed-loop cooling circuit. The liquid dielectric coolant may be circulated around the cooling circuit by a pump (not shown) in a conventional manner.

In addition to conveying liquid dielectric coolant to and from the component modules 2, the inlet and outlet manifolds 6, 10 also act as dc busbars and provide dc power to, and/or receive dc power from, the power electronics components (not shown) that are located inside the component modules. This avoids the need to provide separate dc busbars in addition to the coolant circuit formed by the inlet and outlet manifolds 6, 10. The inlet manifold 6 and inlet pipes 4 are of positive polarity and the outlet manifold 10 and outlet pipes 8 are of negative polarity and hence provide a dc supply to and/or from the component modules 2. The power electronic components (not shown) may be electrically connected to the inlet and outlet pipes 4, 8 by any suitable means such as cables and busbars (not shown) located within the component modules 2. The inlet and outlet manifolds 6, 10 will provide dc power to the power electronic components when the electrical machine is operating as a motor and will receive dc power from the power electronic components when the electrical machine is operating as a generator. It will be readily appreciated that in the case of the wind turbine generator shown in FIG. 1 this may also be operated as a motor in certain circumstances such as for commissioning purposes. The marine propulsion motor shown in FIG. 2 may also be operated as a generator or in a regenerative mode during dynamic braking, for example.

The inlet and outlet manifolds 6, 10 and the inlet and outlet pipes 4, 8 may be made of any electrically conductive material. The primary inlet 12 and the primary outlet 14 may operate at a significant voltage with respect to earth or ground and may therefore be electrically insulated from the metal frame of the electrical machine which would normally be connected to a protective earthing or grounding conductor.

The primary inlet 12 and the primary outlet 14 may also be made of any electrically conductive material and enable the inlet and outlet manifolds 6, 10 to be electrically connected to a suitable supply network or power grid.

Suitable electrical connections (not shown) are also provided between the power electronics components (not shown) located inside the component modules 2 and other control circuitry located within the component modules or external components of the electrical machine.

The fluid-tight housing or container of each component module 2 is filled with the flowing liquid dielectric coolant and the power electronics components (not shown) are completely immersed in the liquid dielectric coolant. The liquid dielectric provides cooling and a dielectric environment in which the power electronics components can be safely operated.

What is claimed is:

1. An assembly for an electrical machine comprising:
   a plurality of component modules; and
   electrically conductive inlet and outlet manifolds for conveying liquid dielectric coolant to and from the component modules and for one or more of supplying power to and receiving power from the component modules;
   wherein the inlet manifold is connected to a primary inlet and the outlet manifold is connected to a primary outlet;
   the component modules being fluid-tight housings containing liquid dielectric coolant, each housing including an inlet pipe connected to the inlet manifold and an outlet pipe connected to the outlet manifold such that liquid dielectric coolant is supplied to the inlet manifold through the primary inlet, is conveyed to each of the housings through the inlet pipes, is conveyed from each of the housings through the outlet pipes to the outlet manifold, and is then discharged through the primary outlet such that, in use, liquid dielectric coolant is circulated through each of the housings to cool power electronics components within each housing that are at least partially immersed in the liquid dielectric coolant.

2. The assembly according to claim 1, wherein the plurality of component modules are provided at angularly spaced-apart locations around the assembly.

3. The assembly according to claim 2, wherein the inlet and outlet manifolds are substantially toroidal.

4. The assembly according to claim 1, wherein the inlet and outlet manifolds carry a dc supply.

5. The assembly according to claim 4, wherein the inlet and outlet manifolds respectively define a busbar for each polarity of the dc supply.

6. The assembly according to claim 1, wherein the inlet and outlet manifolds carry an ac supply.

7. The assembly according to claim 1, wherein the inlet and outlet manifolds respectively define a busbar for a phase of the ac supply.

8. The assembly according to claim 7, further comprising one or more busbars for carrying a phase of the ac supply.

9. The assembly according to claim 1, being mounted to, or forming part of, a stator assembly of an electrical machine.

* * * * *